Aug. 14, 1923.  1,464,811
G. E. EVANS
COTTON GIN
Filed Feb. 26, 1923
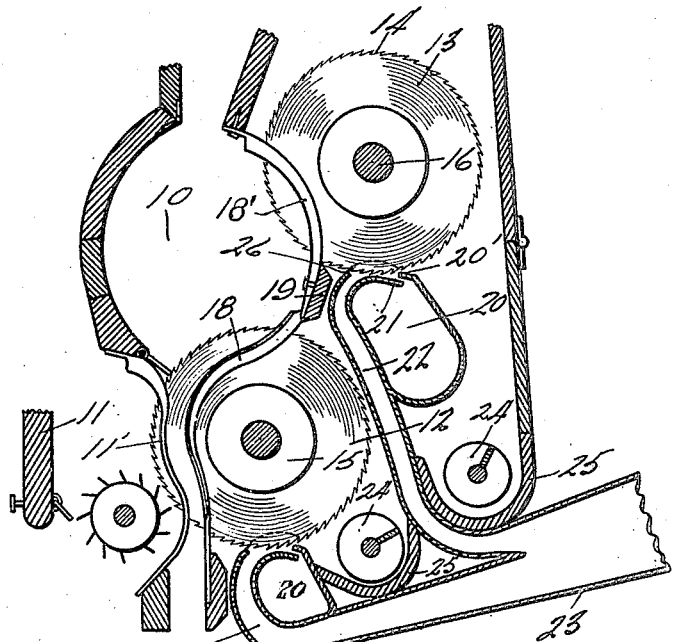
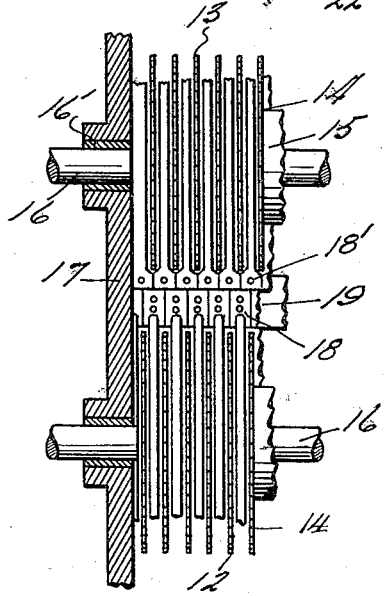
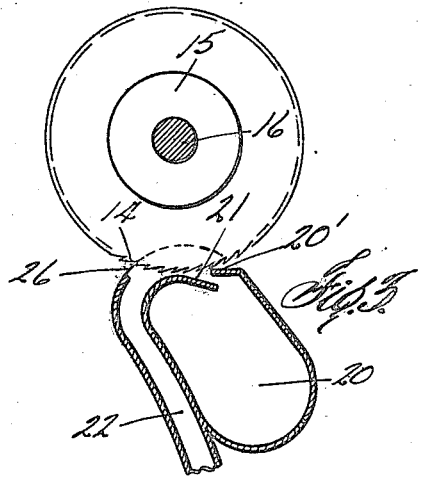
Inventor
G. E. Evans.
By Jack Ashley
Attorney Patented Aug. 14, 1923.

1,464,811

UNITED STATES PATENT OFFICE.

GEORGE E. EVANS, OF WACO, TEXAS.

COTTON GIN.

Application filed February 26, 1923. Serial No. 621,443.

*To all whom it may concern:*

Be it known that I, GEORGE E. EVANS, citizen of the United States of America, residing at Waco, in the county of McLennan and State of Texas, have invented certain new and useful Improvements in Cotton Gins, of which the following is a specification.

This invention relates to new and useful improvements in cotton gins.

In the cotton gin which has been in common use for the past quarter of a century, a single cylinder composed of saws spaced substantially .78 inch apart is used. These saws project between ribs which have a sufficient pitch at the point where the cotton lint is carried between the same to relieve the seeds, which fall or slide down the ribs between the saws. Working in conjunction with the saw cylinder is a roll box and in a plain gin the seed cotton is fed into the top of this box, but in a huller gin, the seed cotton is fed between huller ribs and into the bottom of the box. This box is nearly cylindrical, generally having a slightly greater height than width. The front or outer side of the box is the breast and the inner side is formed usually by a single set of ribs, which are curved to conform thereto. The saws revolve thru the ribs and project into the box about one and one-fourth inches at the deepest point of the concave.

While this style of single saw cylinder gin has proved effective in ginning short staple cotton in which the lint fibres range in length from .80 to 1.25 inches, it has never proven effective in ginning long staple cotton in which the fibres range in length from 1.25 to 2.5 inches. The usual roll box has a general diameter of about twelve inches and the saws which project between the ribs, cut into the roll of seed cotton and revolve the same, whereby the lint cotton is removed from the roll and dragged between the ribs, being removed therefrom by a brush or air suction. It will be seen that saws spaced only about .78 inch apart, would cut and break the long staple cotton.

The object of my invention is to provide in conjunction with a roll box, a pair of saw cylinders, which are spaced apart or superposed and related to the roll box and the ribs thereof in such a manner as to act independently on the roll of seed cotton. A particular object of the invention is to arrange the saws of one cylinder in staggered or alternate relation to those of the other cylinder, so that the saws of one cylinder will plow different channels in the cotton roll from the saws of the other cylinder. It is readily seen that by spacing the saws at a greater distance than .78 inch, a longer staple may be received therebetween. Even with the usual spacing, it has been found that the double saw action will produce a soft, flexible and loose roll, which will enhance the ginning.

Certain attempts have been made by others to employ two saw cylinders with the saws of one in alternate relation to those of the other cylinder, but it has been found that certain conditions and locations are necessary for success. It is important that both cylinders have their saws projecting into the same roll box and it is equally as important that the saw spaces between ribs of one cylinder be separated from the saw spaces of the other cylinder. Therefore one of the objects of the invention is to provide an obstruction or solid member between the upper ends of the lower saw spaces and the lower ends of the upper saw spaces, whereby the lint and seed cotton is prevented from working up the lower spaces and wedging in the bottoms of the upper spaces.

A further object is to increase the efficiency and capacity of the gin and to operate on the roll of seed cotton, without breaking or twisting said roll, either in ginning long or short staple cotton.

An important object of the invention is to arrange the cylinders so that the saws of one do not intermesh with or overlap those of the other cylinder; also to space the cylinders a substantial distance from each other so at to properly function.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is a fragmentary section thru a portion of a huller gin constructed in accordance with my invention, Fig. 2 is a partial vertical sectional view thru the roll box showing the ribs and saws in elevation, and Fig. 3 is an enlarged sectional detail illustrating the air blast nozzle and flue for removing the lint cotton from the saws.

In the drawings the numeral 10 designates a roll box. The gin illustrated is formed with a huller breast 11 and huller ribs 11′, but it is to be understood that the invention may be applied to a plain gin, the invention not being limited to any particular style of air blast gin. The gin includes an upper saw cylinder 13 and a lower saw cylinder 12, each of which includes saws 14 of the usual type and spacing blocks 15 between the saws. Each cylinder is mounted upon an axial shaft 16 having suitable bearings 16′ in the end plates 17 of the gin.

Ribs 18 of suitable construction and shape form a lower set, being convex at the bottom of the box. These ribs have their upper ends fastened to a transverse rib bar 19 located between the saw cylinders. The saws 14 of the lower cylinder 12 extend between the ribs into the bottom of the roll box. Upper ribs 18′ of suitable construction and shape have their lower ends fastened to the bar 19 and their upper ends fastened to the throat of the gin. The upper cylinder 13 has its saws 14 extending between the ribs 18′ into the upper portion of the roll box.

As is shown in Fig. 2 the saws of one cylinder are arranged in staggered or alternate relation to those of the other cylinder and on centers. The saws as illustrated are spaced at a greater distance than in the ordinary gin practice, as now followed, but it is to be understood that closer spacing may be employed for ginning short staple cotton. The provision of two saw cylinders in the same roll box, permits of a wider spacing, when the same is desirable, owing to the staggered relation of the saws. When the wider spacing is employed a longer staple may be ginned without injury from cutting.

A very important feature is the spacing or separation of the saw cylinders with the rib bar 19 therebetween as this permits the saw spaces between the lower set of ribs to terminate before entering or approaching the saw spaces between the upper set of ribs, whereby the upper ribs may be in staggered relation to the lower ribs. By this arrangement the saws of one cylinder cannot overlap those of another cylinder and further a solid obstruction, between upper and lower saw spaces, is offered, whereby the cotton after having been acted upon in the roll box may free itself from the saws and continue its travel around said box. Such an arrangement permits of a proper rib for accomplishing efficient ginning. By reason of the obstruction between the upper and lower saw spaces, cotton cannot be carried up the saw spaces between the lower ribs and wedged into the saw spaces between the upper ribs.

It is preferable to have the saws of both cylinders of the same diameter, but this is subject to variation. By providing two saw cylinders and arranging their saws in staggered relation, the roll of cotton in the box is more efficiently acted upon as the fibre of lint is not simultaneously engaged with more than one saw. This is particularly true with long staple or medium staple cotton and the saws spaced accordingly.

The upper saws will cut into the roll between the paths or furrows of the lower saws and thus will not act upon the same portions. The two cylinders will cause a freer revolution of the roll and acting independently upon the same will prevent its packing, twisting and become too dense. A light fluffy rapidly revolving roll will be maintained in the box and a superior grade of cotton will be ginned. By arranging the saw cylinders out of vertical alinement the pulling power will be increased. The saws of the lower cylinder do not delint the seed which passes between them.

I have shown an air blast lint removing medium associated with each cylinder and it is to be understood that any of the well known air blast and air suction systems may be used. Beneath each saw cylinder an air compartment 20 extends horizontally and transversely of the gin stand and is supplied with air under pressure from a suitable source. Each air compartment, as is shown in Fig. 3 is equipped with a nozzle 20′ arranged in close proximity to the teeth of the saws and preferably tangential thereto, so as to direct the air along said teeth in a clockwise direction. At each end of the nozzle is an upstanding guard flange 26 which prevents lateral displacement of the lint from the end saws.

The saws dip into a relatively wide mouth 21 provided in the upper end of each lint flue 22 and the lint is discharged directly into these mouths. Each flue 22 constitutes a branch of a main flue 23. Below the space blocks 15 of each cylinder is arranged a conveyor 24 in a suitable trough 25. As the air blast features permit of much variation and are not a part of the invention, except in a general way, it is not considered necessary to enter into a detailed description of the same.

It has been found practical to space the saw cylinders so that their nearest approach will be at least the distance of the length of the longest fibre to be ginned. However the spacing of the saw cylinders may be varied in accordance with the demands.

It will be noted that the ribs are shown as formed in an upper set separate from a lower set, but it is possible to form them integral, provided there is an obstruction between the upper and lower saw spaces. It is possible in an invention of this character to make various changes in the size and shape of the parts and all such as come within the scope of the appended claims are included.

This application is a continuation in part of my application filed March 13th, 1922, Serial Number 543,253, and the features relating to the air nozzle and lint flue with its mouth located under the space blocks has been made the subject matter of a divisional application filed of even date herewith, Ser. No. 621,442.

What I claim, is:

1. In a cotton gin, a roll box having curved ribs forming one side thereof, said ribs having an upper set of saw spaces and a lower set of saw spaces entirely separated from the upper set of spaces, said ribs having a continuous transverse bar between their upper and lower saw spaces, a saw cylinder having its blades projecting thru the upper saw spaces of the ribs, a second saw cylinder having its blades projecting thru the lower saw spaces of the ribs, the blades of both cylinders projecting into the same roll box, and air flues adjacent the cylinders for removing the lint from the blades.

2. In a cotton gin, a roll box having curved ribs forming one side thereof, said ribs having an upper set of saw spaces and a lower set of saw spaces entirely separated from the upper set of spaces, said ribs having a continuous transverse bar between their upper and lower saw spaces, a saw cylinder having its blades projecting thru the upper saw spaces of the ribs, a second saw cylinder having its blades projecting thru the lower saw spaces of the ribs, the blades of both cylinders projecting into the same roll box, and air flues adjacent the cylinders for removing the lint from the blades, the saw cylinders being spaced a substantial distance from each other and being free from overlapping, the saw blades being spaced relatively wide apart.

3. In a cotton gin, a roll box, curved ribs forming one side of said box, the ribs comprising an upper concaved set and a lower convex set, the saw spaces between the upper set of ribs being in staggered relation to those of the lower set and free from connection therewith, an upper saw cylinder having its blades projecting thru the saw spaces of the upper concave set of ribs, a lower saw cylinder having its blades projecting thru the saw spaces of the lower convex set of ribs, both cylinders having their blades projecting into the same roll box, and air flues adjacent the saws for removing the lint cotton therefrom.

4. In a cotton gin, a roll box, curved ribs forming part of said box, a pair of saw cylinders having their blades projecting into said box in staggered relation and being spaced at their nearest approach at least the distance of the length of the longest fibre to be ginned, said saw cylinders acting independently and having their blades spaced in proportion to the length of the fibre to be ginned, and air flues adjacent the saws for removing the lint cotton therefrom.

5. In a cotton gin, a roll box having curved ribs forming one side thereof, said ribs having an upper set of saw spaces and a lower set of saw spaces entirely separated from the upper set of saw spaces, there being an obstruction between the lower end of each saw space and the upper end of the correlated lower saw space, a saw cylinder having its saws projecting thru the upper saw spaces of the ribs, a second saw cylinder having its saws projecting thru the lower saw spaces of the ribs, the saws of both cylinders projecting into the same roll box, and air blast means for removing lint cotton from the cylinder.

6. In an air blast cotton gin, a roll box, an upper set of ribs and a lower set of ribs forming one side of the roll box, a transverse bar to which the lower ends of the upper ribs and the upper ends of the lower ribs are fastened, the upper ribs having saw spaces above said bar, the lower ribs having saw spaces below said bar in staggered relation to the upper saw spaces, an upper saw cylinder having its saws extending into the roll box thru the upper saw spaces, a lower saw cylinder having its saws extending into the same roll box thru the lower saw spaces, the lower saw cylinder being spaced from the upper saw cylinder and the bar being between the cylinders, and air flues adjacent the saws of the cylinders for removing the lint cotton therefrom.

7. In an air blast cotton gin, a roll box, an upper set of ribs and a lower set of ribs forming one side of the roll box, a transverse bar to which the lower ends of the upper ribs and the upper ends of the lower ribs are fastened, the upper ribs having saw spaces above said bar, the lower ribs having saw spaces below said bar in staggered relation to the upper saw spaces, an upper saw cylinder having its saws extending into the roll box thru the upper saw spaces, a lower saw cylinder having its saws extending into the same roll box thru the lower saw spaces, the lower saw cylinder being spaced from the upper saw cylinder and the bar being between the cylinders, air flues adjacent the saws of the cylinders for removing the lint cotton therefrom, and mote conveyers correlated with the saw cylinders.

8. In an air blast cotton gin, a roll box, ribs forming one side of the box and having a lower set of saw spaces and an upper set of saw spaces entirely separated from the lower spaces and offset laterally therefrom, an upper saw cylinder extending thru the upper saw spaces into the top of the roll box, a lower saw cylinder extending thru the lower saw spaces into the bottom of the roll box, the saws of the lower cylinder being offset laterally from the saws of the upper cylinder, an air flue adjacent the saws of the upper cylinder for removing the lint cotton therefrom, and a second air flue adjacent the saws of the lower cylinder for removing the lint cotton therefrom.

9. In an air blast cotton gin, a roll box, ribs forming one side of the box and having upper saw spaces and lower saw spaces, the upper saw spaces being entirely separated from the lower saw spaces and offset laterally therefrom, an upper saw cylinder having its saws spaced relatively wide apart and extending thru the upper saw spaces into the top of the box, a lower saw cylinder having its saws spaced relatively wide apart and extending thru the lower saw spaces into the bottom of the box and offset laterally from the upper saws, an air flue adjacent the saws of the upper cylinder for removing the lint cotton therefrom, and a second air flue adjacent the saws of the lower cylinder for removing the lint cotton therefrom.

In testimony whereof I affix my signature.

GEORGE E. EVANS.